United States Patent [19]

Nohejl

[11] 4,038,739

[45] Aug. 2, 1977

[54] MACHINE TOOLS HAVING INTERCHANGEABLE TOOL CARRYING UNITS

[75] Inventor: Antonin Nohejl, Surbiton, England

[73] Assignee: The Mollart Engineering Company, Limited, Surbiton, England

[21] Appl. No.: 636,716

[22] Filed: Dec. 1, 1975

[30] Foreign Application Priority Data

Dec. 4, 1974 United Kingdom ............. 52482/74

[51] Int. Cl.² ........................................ B23Q 3/157
[52] U.S. Cl. ...................................... 29/568; 408/35
[58] Field of Search ............... 29/568, 26 A; 408/35; 74/817

[56] References Cited

U.S. PATENT DOCUMENTS

| | | | |
|---|---|---|---|
| 2,773,430 | 12/1956 | Berthiez | 29/26 A X |
| 3,286,595 | 11/1966 | Wollenhaupt | 29/568 X |
| 3,300,856 | 1/1967 | Daugherty | 29/568 |
| 3,412,459 | 11/1968 | Hollis | 29/568 |
| 3,762,036 | 10/1973 | Goebel et al. | 29/568 |
| 3,797,363 | 3/1974 | Nohejl | 408/35 X |
| 3,851,380 | 12/1974 | Kurimoto et al. | 29/568 |
| Re. 25,670 | 10/1964 | Hansen et al. | 408/35 X |

FOREIGN PATENT DOCUMENTS 1,803,989 6/1969 Germany ............. 408/35

Primary Examiner—Othell M. Simpson
Assistant Examiner—Z. R. Bilinsky
Attorney, Agent, or Firm—Stevens, Davis, Miller & Mosher

[57] ABSTRACT

A machine tool for interchanging tool carrying units includes a guideway for slidably supporting the tool units, a substantially horizontal slideway, and a pivot member adjacent one end of the guideway. The tool carrying units are mounted about the pivot member. The tool also includes structure for rotating the pivot member about an axis parallel to the slideway for angularly moving the tool carrying units about the axis from an inoperative position to an operative position above the slideway or vice versa. A movable structure is mounted on the slideways. The tool includes structure for moving the movable structure along the slideway to engage the tool carrying unit in operative position and to move the interconnected movable structure and tool carrying unit along the slideway in a direction parallel to the axis to detach the tool carrying unit from the pivot member and to move said unit to a working position. The tool also includes drive structure on the movable structure for driving the tools on the units in the working position for performing a machining operation, and structure for selectively moving the tool carrying units along the guideway from a storage position to the inoperative position on the pivot member and vice versa.

10 Claims, 5 Drawing Figures

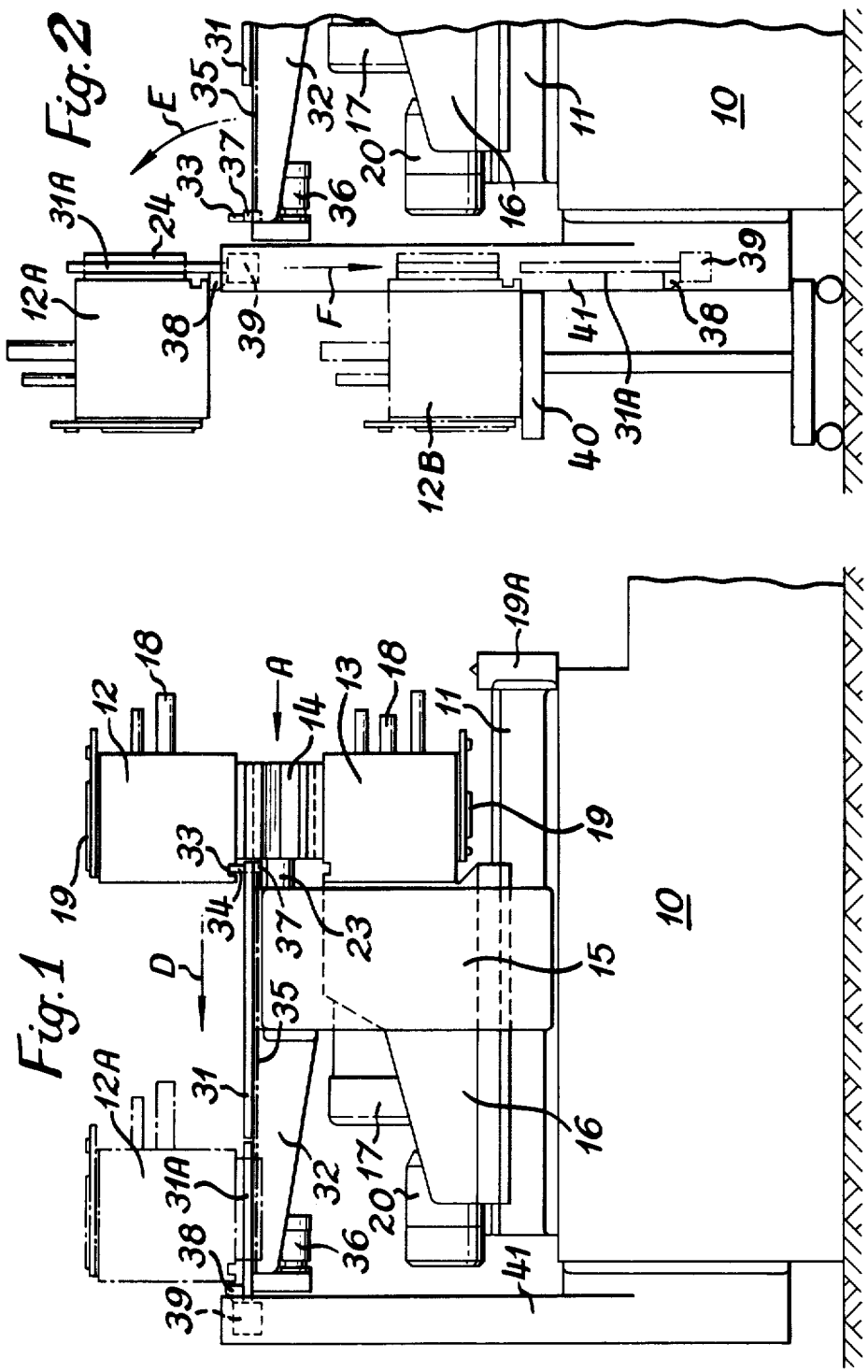

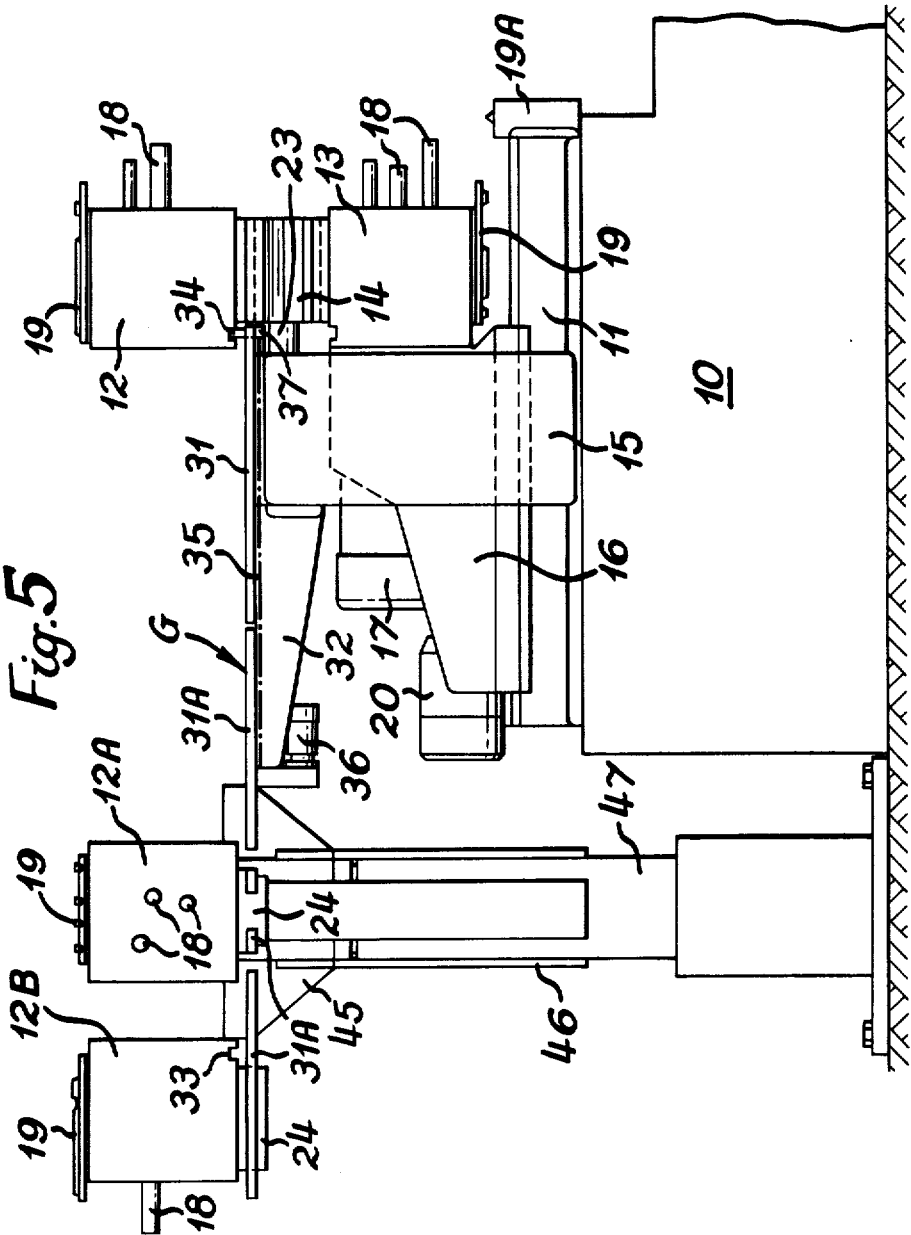

MACHINE TOOLS HAVING INTERCHANGEABLE TOOL CARRYING UNITS

This invention relates to machine tools having at least two inerchangeable tool carrying units.

A machine tool of this kind is described in applicant's U.S. Pat. No. 3,797,363 and, in this machine tool, the tool carrying units are mounted about a common pivot member which is rotated about a horizontal axis for angularly moving the tool units about the axis from an inoperative position to an operative position above a horizontal slideway. A movable structure is slidably mounted on the slideway for engaging and interconnecting with the tool carrying unit in the operative position. The interconnected movable structure and tool carrying unit is then movable along the slideway to detach the tool carrying unit from the pivot member and to move the unit into working position. The movable structure incorporates drive means for driving the tools on the unit in the working position for performing a machining operation.

In the machine tool of my prior patent as described above the tool carrying unit in the inoperative position can only be removed by releasing the unit from the pivot member and then sliding the unit forwardly away from the pivot member by means of a hoist or other lifting equipment. The present invention has for its object to provide an improved mechanism whereby the tool carrying unit in the inoperative position can be disconnected and automatically moved to a storage position.

According to the present invention the pivot member supporting the tool carrying units is provided with a guideway for slidably receiving a portion of the corresponding tool carrying unit, the tool carrying units being maintained in operative engagement with the pivot member by resilient catch devices. In a preferred embodiment of the invention the catch devices comprise spring urged plungers having angular nose portions engaging corresponding apertures in the guideway of the pivot member. Preferably the nose portions of the plungers are formed with a pair of angular surfaces extending at different angles to the longitudinal axis of the plunger so as to obtain different retaining forces in the forward and backward directions of movement of the tool carrying units relative to the supporting pivot member.

In the inoperative position of a tool carrying unit the corresponding guideway is located in line with a corresponding sationary guideway leading to a storage section or other unit. A transfer device is provided such as a conveying unit which may be in the form of a motor driven lead screw carrying a travelling nut having an upstanding drive tongue engaging a corresponding slot in the tool carrying unit when in the inoperative position.

The invention will now be described by way of example with reference to the accompanying drawings in which:

FIG. 1 is a side elevation of a machine tool incorporating the features of the invention;

FIG. 2 is a paratial view corresponding to FIG. 1 showing the sequence of operations for positioning an inoperative tool carrying unit on a storage device;

FIG. 5 is a side elevation of a modified machine tool in accordance with the invention utilizing a carousel magazine.

Figure 4:
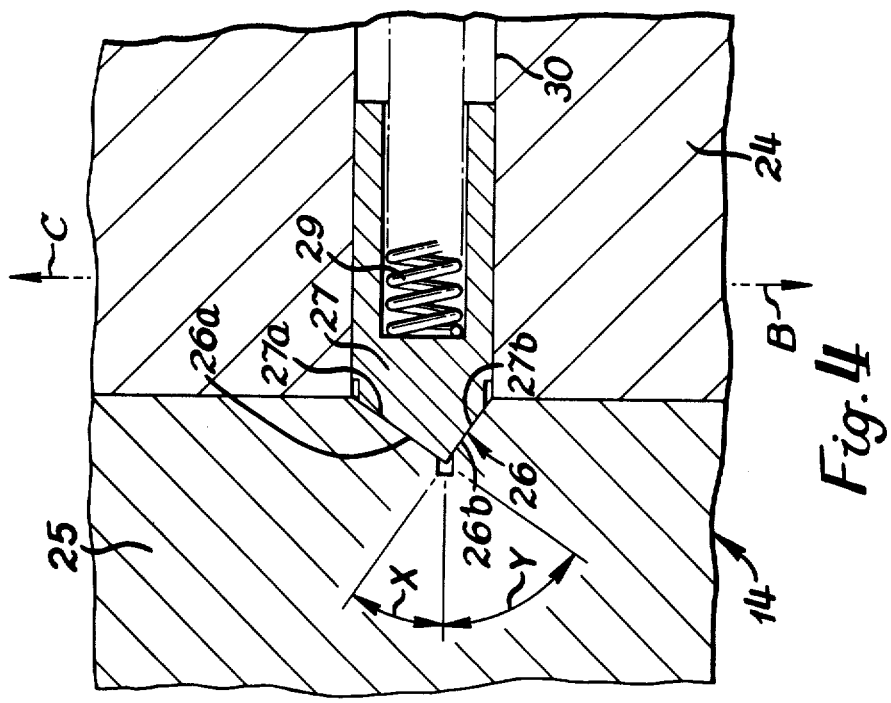
FIG. 4 is a section taken on the line 4—4 of FIG. 3.

The embodiments of the invention shown in the drawings are both concerned with a machine tool of the kind described in my U.S. Pat. No. 3,797,363 to which reference should be made for a detailed description of the construction and operation of the machine. Briefly, however, the machine tool comprises a frame 10 having a horizontal slideway 11 and two tool carrying heads or units 12 and 13 which are mounted on opposite sides of a common pivot member 14 rotatably mounted in frame support member 15. The pivot member 14 is rotatable about a horizontal axis 23 for angularly moving said tool carrying units about said axis from an upper inoperative position to a lower operative position above the slideway 11 or vice-versa. A movable structure 16 is slidably mounted on the slideway 11 and is movable along the slideway to engage the tool carrying unit 13 in the operative position. The movable structure 16 is interconnected with the tool carrying unit in the operative position (as shown in FIG. 1) and the interconnected movable structure 16 and tool carrying unit 13 are thereafter moved along the slideway 11 to detach the tool carrying unit 13 from the pivot member 14 and to move the unit to a working position. The movable structure 16 includes a motor 17 for driving tools 18 on the interconnected unit in the working position for performing a machining operation. The tool carrying units 12 and 13 are each provided with a trip plate 19 which is mounted externally on the unit. An electric motor 20 is energized to advance the movable structure 16 of the operative unit along the slideway 11. The trip plate 19 controls the operative range of movement or storke of the operative unit 13 by operation of a limit switch box 19A which is arranged to deenergize motor 20 and energize motor 17.

Figure 3:
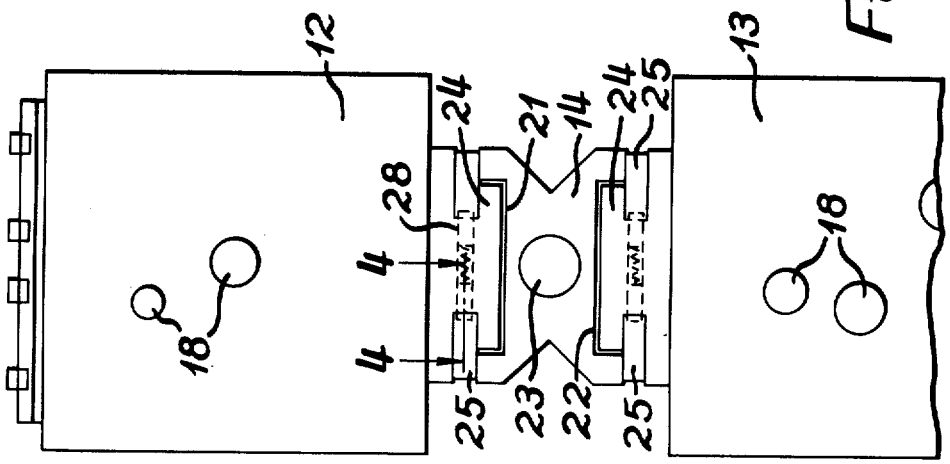
FIG. 3 is a partial end view taken in the direction indicated by the arrow A in FIG. 1.

According to the invention the tool carrying units 12 and 13 are slidably mounted on the pivot member 14 in such a manner that they can be disconnected from the pivot member by a horizontal sliding movement in either direction. As shown more clearly in FIG. 3 the pivot member in corss-sectional shape incorporates a pair of parallel guideways 21 and 22 located one on each side of the pivot axis 23, the guideways 21 and 22 slidably receiving a T-shaped section 24 projecting from the corresponding face of the tool carrying units 12 and 13. The external parts of the pivot member 14 comprise inwardly directed portions 25 which engage the narrow part 28 of the T-shaped section 24 of the tool carrying units 12 and 13. As shown in FIG. 4 the inwardly directed portions 25 of the pivot member 14 incorporate shaped apertures 26 for receiving plungers 27 urged outwardly by springs 29 and carried by the tool carrying units in slots 30 in the narrow portions 28 of the T-shaped extensions 24. The nose portions of the plungers 27 are formed with two angular surfaces 27a, 27b which are located at different angles to the longitudinal axis of the plungers 27. The corresponding surfaces 26a, 26b of the apertures 26 in the portions 25 are similarly formed and the angles of the surfaces are selected so that different retaining forces are provided by the plungers depending on the direction of movement of the tool carrying units relative to the pivot member 14.

The angles are chosen so that a greater retaining force is obtained when the tool carrying units 12 and 13 are moved in a forward direction, i.e., in a direction towards the working position of the machine tool as shown by the arrow B in FIG. 4. The angle X of the surfaces 26b, 27b providing this greater retaining force is approximately 30° to 40° to the longitudinal axis of the plunger. The angle Y of the other retaining surfaces 26b, 27b may be in the range of 50° to 60° so as to provide a lesser retaining force when the tool carrying units are moved rearwardly relative to the pivot member as shown by the arrow C in FIG. 4.

The tool carrying unit 12 in the inoperative position is adapted to slide rearwardly as shown by the arrow D in Fig. 1 and to this end the guideway 21 in the pivot member 14 is located adjacent and in line with a similar guideway 31 mounted on a fixed frame 32 of the machine. As the tool carrying unit 12 moves to the inoperative position a slot 33 in the body of the unit 12 is adapted to engage over an upwardly extending tongue 34 forming part of a conveyor device. In the preferred arrangement of the conveyor device may comprise a lead screw 35 driven by a motor 36 and provided with a travelling nut 37 on which the upstanding tongue 34 is mounted. The arrangement is such that operation of the conveyor device moves the tongue 34 and thereby the corresponding tool unit 12 rearwardly in the direction of arrow D when the motor 36 is energized, the force exerted overcoming the retaining force of the plungers 27 engaging the apertures 26 in the guideway 25 of the pivot member 14.

The conveying device moves the inoperative tool carrying unit 12 along the guideway 31 rearwardly of the machine to a position shown in FIG. 1 by a unit 12A and in which the unit may be removed to a storage device or into a suitable magazine.

In one arrangement the guideway 31 includes a pivotable end portion 31A which may be moved to an upright position when the tool carrying unit 12A is engaged thereon as shown by arrow E in FIG. 2. The angularly movable portion 31A of the guideway 31 includes an end-stop arrangement 38 for supporting and engaging the tool carrying unit 12A and in the upright position the tool carrying unit 12A is disengaged from the tongue 34 on the nut 37 of the lead screw 35 or similar device. The arrangement is such that the angularly movable portion 31A of the guideway 31 is capable of downward movement as shown by the arrow F in FIG. 2 under the control of motor means 39 when in the upright position and by suitable positioning of a trolley 40 or other support member the tool carrying unit can be located thereon as shown by units 12B while disengaging from the guideway 31A as it moves downwardly as shown in broken lines in its supporting frame 41.

FIG. 5 shows a modified arrangement in which the inoperative tool carrying units are positioned in a carousel magazine shown generally by the reference 45. The magazine 45 is supported on a column 47 and is rotatable for transfering a unit located at position G on the fixed guideway 31 to an inoperative position by way of a rotary movement in the horizontal plane. The magazine 45 incudes a lift for moving a tool carrying unit upwardly at the end of the fixed guideway 31 so as to disengage the unit at position G from the tongue of the lead screw of the conveying device. The magazine is then indexed and the next unit in the magazine can then be moved into position G for lowering by the lift into engagement with the tongue which may then be operated by the lead screw or other conveying device to move the unit forwardly into the upper inoperative position in engagement with the guideway of the pivot member.

An additional vertical slide 46 can be provided on the vertical magazine column 47 for lowering in order to ease the tool checking and changing.

It will be appreciated that the invention provides a greatly simplified arrangement by which the tool carrying units are mounted on the pivot member for easy attachment and disconnection. The mounting of the tool carrying units in guideways enables the units to be moved forwardly into a working position or rearwardly into a conveying guideway for automatic movement into a storage device or magazine. The simple catch devices for connecting the units to the pivot member enable automatic operation to be effected and the provision of different retaining forces prevents forward movement into working direction except under the applied force of the actuating motor for the movable structure on the main slideway of the machine tool.

I claim:

1. A machine tool having means for interchanging tool carrying units, said machine tool comprising:
   at least two tool carrying units;
   a guideway having means for slidably supporting said tool units;
   a substantially horizontal slideway;
   a pivot member adjacent one end of said guideway, said tool carrying units being mounted about said pivot member; at least two means on said pivot member for slidably interconnecting said tool carrying units thereto;
   means for rotating said pivot member about an axis parallel to said slideway for angularly moving said tool carrying units about said axis from an inoperative position where one of said means on said pivot member is aligned with said guideway to an operative position above said slideway or vice versa;
   a movable structure slidably mounted on said slideway;
   means for moving said movable structure along said slideway to engage the tool carrying unit in said operative position and to move said interconnected movable structure and tool carrying unit along slideway in a direction parallel to said axis to detach said tool carrying unit from said pivot member and to move said unit to a working position;
   drive means on said movable structure for driving the tools on said units in said working position for performing a machining operation; and
   means for selectively moving the tool carrying units along said guideway from a storage position to said inoperative position on said pivot member and vice versa.

2. A machine tool as claimed in claim 1, wherein the at least two means on said pivot member comprise second guideways for slidably receiving a portion of the corresponding tool carrying units, and resilient catch devices for releasably interconnecting the tool carrying units and the pivot member.

3. A machine tool as claimed in claim 2, wherein the catch devices each comprise spring urged plungers having angular nose portions engaging corresponding apertures in the second guideways of the pivot member.

4. A machine tool as claimed in claim 3, wherein the nose portions of the plungers are formed with a pair of angular surfaces extending at different angles to the longitudinal axis of the plungers so as to obtain different retaining forces in the different directions of movement of the tool carrying units relative to the supporting pivot member.

5. A machine tool as claimed in claim 4, wherein the angular surfaces are located so that a greater retaining force is obtained in the direction of movement of a tool carrying unit from its operative position into the working position.

6. A machine tool as claimed in claim 5, wherein one of the pair of angular surfaces of the nose portions of the plungers extends at an angle of 30° to 40° to the longitudinal axis of the plunger so as to provide the greater retaining force to the direction of movement of a tool carrying unit to the working position.

7. A machine tool as claimed in claim 6, wherein the other one of the pair of angular surface of the nose portions of the plungers extends at an angle of 50° to 60° to the longitudinal axis of the plunger so as to provide a lesser retaining force when a tool carrying unit is slidably moved from an inoperative position to the storage position.

8. A machine tool as claimed in claim 1 wherein said first-mentioned guideway leads to a storage section.

9. A machine tool as claimed in claim 8, wherein the means for selectively moving the tool carrying units comprises a conveying unit for engaging a tool carrying unit in the inoperative position and for moving that unit to a storage device.

10. A machine tool as claimed in claim 9, wherein the conveying unit comprises a motor driven lead screw bearing a travelling nut having an upstanding drive tongue engaging a corresponding slot in the tool carrying unit.

* * * * *